(12) United States Patent  
Chung

(10) Patent No.: US 9,131,801 B2  
(45) Date of Patent: Sep. 15, 2015

(54) BARBECUE GRILL APPARATUS

(71) Applicant: Kiosky Chung, Taichung (TW)

(72) Inventor: Kiosky Chung, Taichung (TW)

(*) Notice: Subject to any disclaimer, the term of this patent is extended or adjusted under 35 U.S.C. 154(b) by 427 days.

(21) Appl. No.: 13/762,928

(22) Filed: Feb. 8, 2013

(65) Prior Publication Data

US 2014/0224240 A1   Aug. 14, 2014

(51) Int. Cl.
*A47J 37/07* (2006.01)
*A47J 37/04* (2006.01)
*A47J 37/06* (2006.01)

(52) U.S. Cl.
CPC ............ *A47J 37/041* (2013.01); *A47J 37/0623* (2013.01); *A47J 37/0704* (2013.01)

(58) Field of Classification Search
CPC . A47J 37/041; A47J 37/0704; A47J 37/0623; A47J 37/0786; A47J 2037/0795
See application file for complete search history.

(56) References Cited

U.S. PATENT DOCUMENTS

| | | | | |
|---|---|---|---|---|
| 3,520,290 A | * | 7/1970 | Winters | 126/25 R |
| 4,628,896 A | * | 12/1986 | Baynes | 126/25 R |
| 4,667,652 A | * | 5/1987 | Bunton | 126/25 R |
| 4,979,437 A | * | 12/1990 | Giebel | 99/345 |
| 5,806,510 A | * | 9/1998 | Fischer et al. | 126/51 |
| 5,927,267 A | * | 7/1999 | McKenzie | 126/41 R |
| 2006/0086354 A1 | * | 4/2006 | Kahler et al. | 126/337 R |
| 2008/0099009 A1 | * | 5/2008 | Watrous | 126/25 R |

* cited by examiner

*Primary Examiner* — Alfred Basichas

(57) ABSTRACT

A barbecue grill apparatus includes a casing, a cover, two cooking grills, two warming grills and two supporting elements. The cover is pivotally connected to the casing. The cooking grills are pivotally connected to the casing. The warming grills are pivotally connected to the cover. Each of the supporting elements connects a corresponding one of the cooking grills to a corresponding one of the warming grills. The warming grills are placed horizontally as the cover is lifted from the casing. Each of the warming grills is moved from the horizontal position as the corresponding one of the cooking grills is lifted from the casing.

7 Claims, 6 Drawing Sheets

BARBECUE GRILL APPARATUS

BACKGROUND OF INVENTION

1. Field of Invention

The present invention relates to a barbecue grill apparatus and, more particularly, to a barbecue grill apparatus good for cooking food and keeping it warm.

2. Related Prior Art

As disclosed in U.S. Pat. No. 3,520,290, a conventional grill 10 includes a casing 11, a cooking grate 20, a cover 25, a warming grate 29, two grate-supporting brackets 30, two attaching brackets 44, two guide arms 47 and two latches 51. The cooking grate 20 is placed in the casing 11. The cover 25 is pivotally connected to the casing 11. The warming grate 29 is detachably supported on the grate-supporting brackets 30. Each grate-supporting bracket 30 includes a base 33 connected to a groove element 37 by two posts 38 and 39. The base 33 of each grate-supporting bracket 30 is secured to the casing 12. Each attaching bracket 44 includes an aperture 44b defined therein and is attached to the cover 25. Each guide arm 47 includes a pin 49 secured thereto. Each latch 51 includes a notched end 51b. Each guide arm 47 is pivotally connected to a corresponding leg 39. Each latch 51 is pivotally connected to a corresponding guide arm 47. Each pin 49 is inserted through a corresponding aperture 44b. The notched end 51b of each latch 51 is engaged with a corresponding pin 49. Thus, the grate-supporting brackets 30 are extended to place the warming grate 29 horizontally for use when the cover 25 is lifted from the casing 11. The use of the grill 10 is not without any problems. To add coal into the casing 11 from time to time, the cooking grate 20 has to be removed or lifted from the casing 11. A user may remove food from the cooking grate 20 before he or she uses a hand to remove or lift the cooking grate 20 from the casing 11 and uses the other hand to add coal into the casing 11. Alternatively, the user may leave the food on the cooking grate 20 and use both hands to move the cooking grate 20 to a safe place from the casing 11 before he or she uses a hand to add coal into the casing 11. Both practices are inconvenient. Moreover, the addition of coal deep into a rear portion of the interior of the casing 11 is hindered by the warming grate 29.

As disclosed in U.S. Pat. No. 4,979,437, another conventional barbecue grill 12 includes a housing 16, a cover 18, a gas burner 20, a cooking grill 22, a lower warming rack 24, a lower U-shaped bail 25, an upper warming rack 26 and an upper U-shaped bail 34. The cover 18 is pivotally connected to the housing 16. The gas burner 20 is placed in and connected to the housing 16. The cooking grill 22 is placed in the housing 16. The lower warming rack 24 and the upper warming rack 26 are pivotally connected to the cover 18. The lower U-shaped bail 25 includes a lower portion pivotally connected to the housing 16 and an upper portion pivotally connected to the lower warming rack 24. The upper U-shaped bail 34 includes a lower portion movably connected to the lower warming rack 24 and an upper portion pivotally connected to the upper warming rack 26. Thus, the warming racks 24 and 26 are placed horizontally for use when the cover 18 is lift from the housing 16. This configuration is suitable for gas-burning grills, not for coal-burning grills. To add coal into the housing 16 from time to time, the cooking grill 22 has to be removed or lifted from the housing 16. However, the movement of the cooking grill 22 is hindered by the lower U-shaped bail 34. A user may remove food from the cooking grill 22 before he or she uses a hand to remove or lift the cooking grill 22 from the housing 16 and uses the other hand to add coal into the housing 16. Alternatively, the user may leave the food on the cooking grill 22 and use both hands to move the cooking grill 22 to a safe place from the housing 16 before he or she uses a hand to add coal into the housing 16. Moreover, the addition of coal deep into a rear portion of the interior of the housing 16 is hindered by the lower warming rack 24.

As disclosed in US Patent Application Publication 2006/0086354, another conventional grill 100 includes a housing 162, a cover 164, a cooking structure 170, a warming rack 110, two supports 120 and two mounting devices 130. The cover 164 is pivotally connected to the housing 162. The cooking structure 170 is placed in the housing 162. Each support 120 includes two legs 124 extending from a beam 126. Each leg 124 is pivotally connected to the cooking structure 170 by a corresponding mounting device 130. The warming rack 110 is connected to the beams of the supports 120. The use of the grill 100 is not without any problems. The lifting of the cover 164 from the housing 162 does not automatically place the warming rack 110 in an active position because the warming rack 110 is not connected to the cover 164. Therefore, a user has to lift the cover 164 before he or she can place the warming rack 110 in an active position. Moreover, to add coal into the housing 162 from time to time, the user has to remove all of the cooking structure 170, the warming rack 110, the supports 120 and the mounting devices 130 from the housing 162, and this could be a heavy load for the user. The user may remove food from the cooking structure 170 before he or she uses a hand to remove or lift the cooking structure 170, the warming rack 110, the supports 120 and the mounting devices 130 from the housing 162 and uses the other hand to add coal into the housing 162. Alternatively, the user may leave the food on the cooking structure 170 and the warming rack 110 and use both hands to move the cooking structure 170, the warming rack 110, the supports 120 and the mounting devices 130 to a safe place from the housing 162 before he or she uses a hand to add coal into the housing 162.

Therefore, the present invention is intended to obviate or at least alleviate the problems encountered in prior art.

SUMMARY OF INVENTION

It is the primary objective of the present invention to provide a convenient barbecue grill apparatus.

To achieve the foregoing objective, the barbecue grill apparatus includes a casing, a cover, two cooking grills, two warming grills and two supporting elements. The cover is pivotally connected to the casing. The cooking grills are pivotally connected to the casing. The warming grills are pivotally connected to the cover. Each of the supporting elements connects a corresponding one of the cooking grills to a corresponding one of the warming grills. The warming grills are placed horizontally as the cover is lifted from the casing. Each of the warming grills is moved from the horizontal position as the corresponding one of the cooking grills is lifted from the casing.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
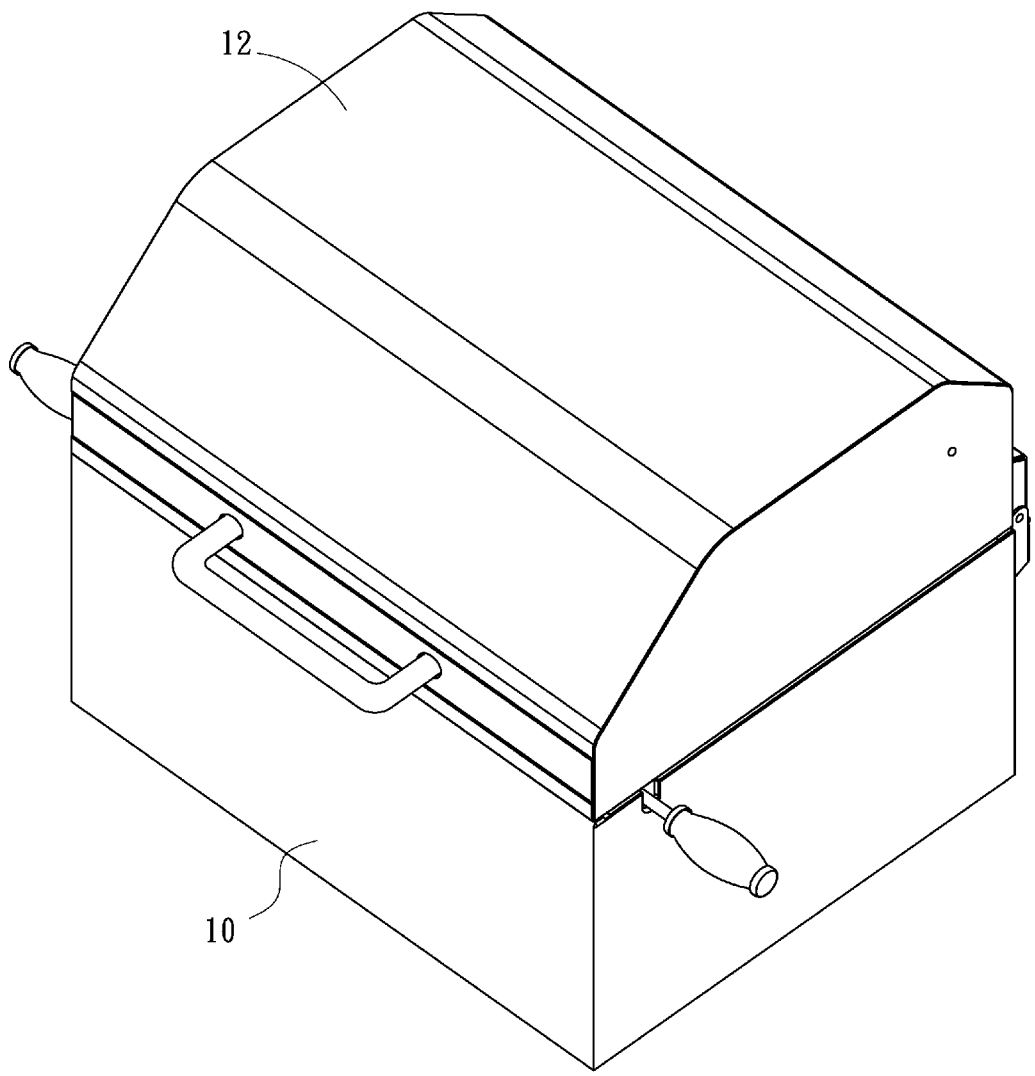
FIG. 1 is a perspective view of a barbecue grill apparatus in a closed position according to the preferred embodiment of the present invention.
Figure 2:
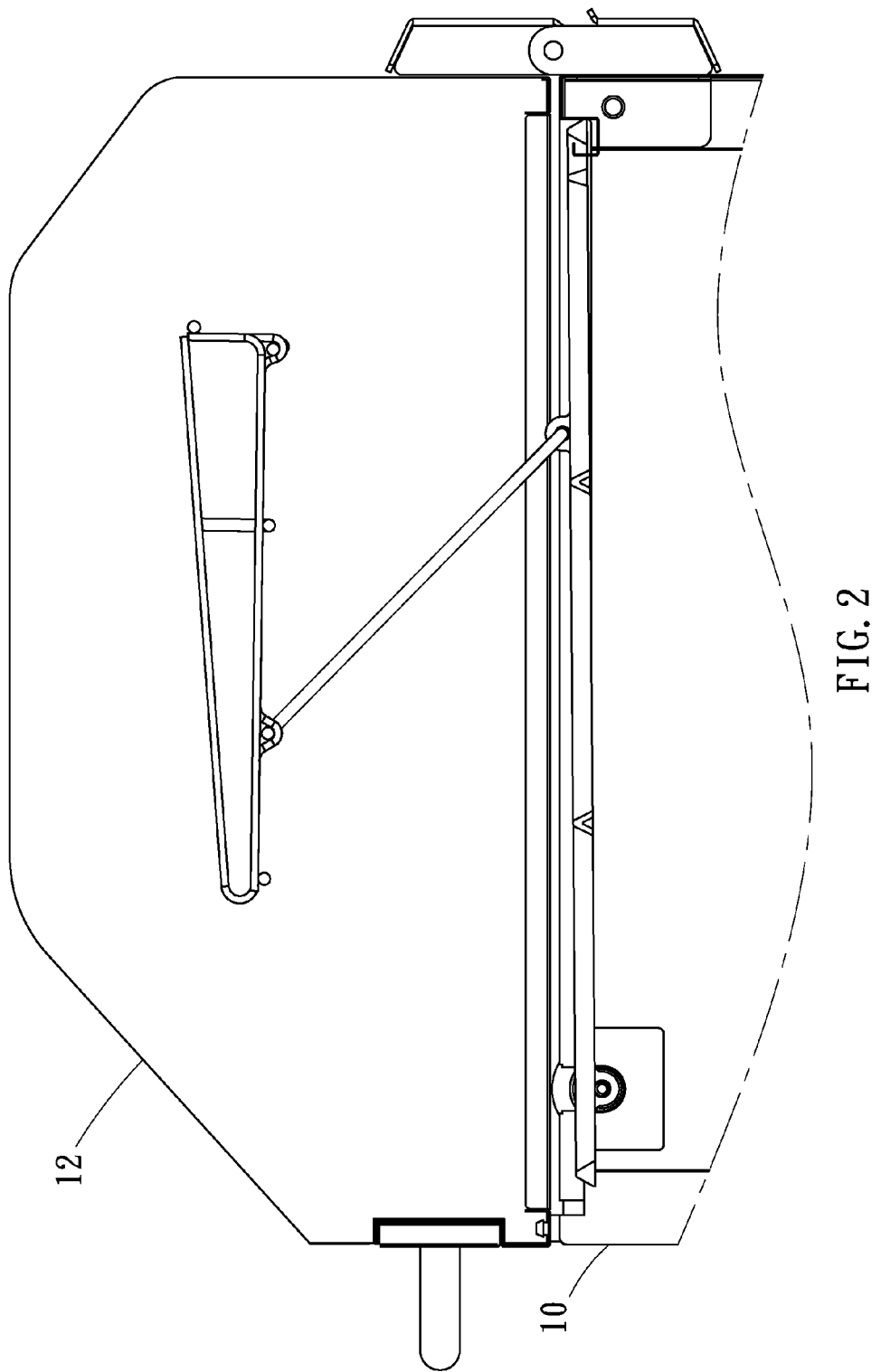
FIG. 2 is a cross-sectional view of the barbecue grill apparatus shown in FIG. 1.
Figure 3:
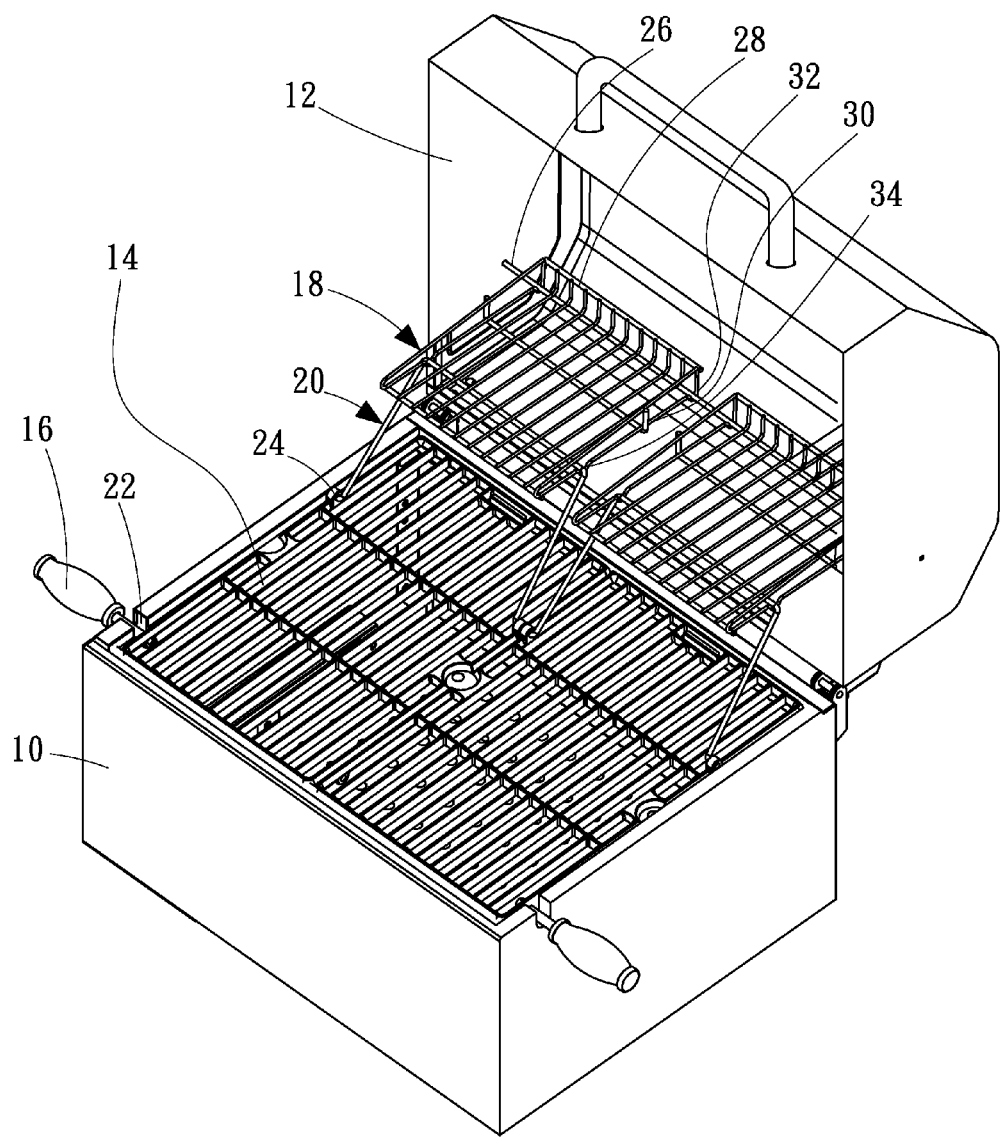
FIG. 3 is a perspective view of the barbecue grill apparatus in an open position other than shown in FIG. 1.
Figure 4:
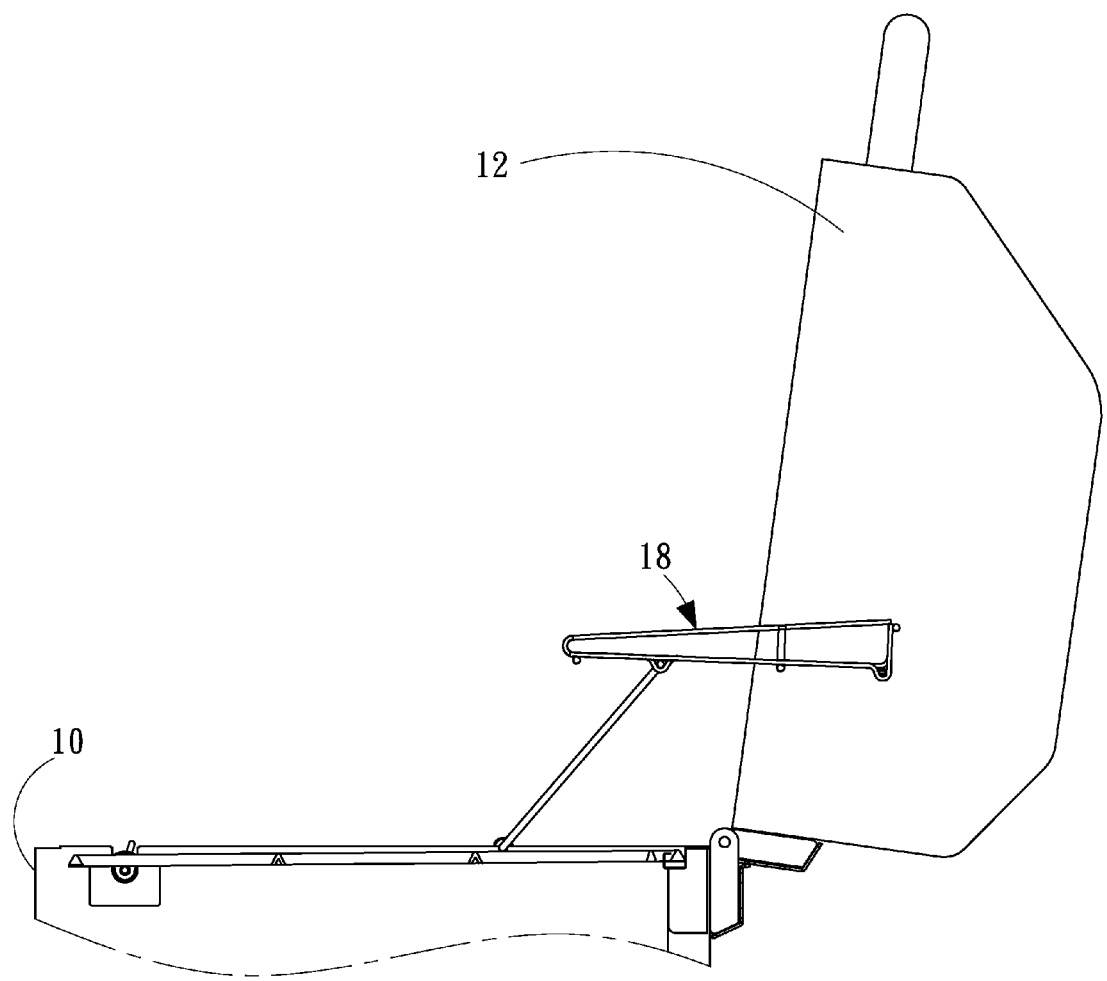
FIG. 4 is a cross-sectional view of the barbecue grill apparatus in another position shown in FIG. 3.

Referring to FIGS. 1 to 6, there is shown a barbecue grill apparatus according to the preferred embodiment of the present invention. The barbecue grill apparatus includes a casing 10 pivotally connected to a cover 12. The cover 12 can be laid on the casing 10 for storage as shown in FIGS. 1 and 2. The cover 12 can be lifted from the casing 10 for use as shown in FIGS. 3 and 4. The barbecue grill apparatus further includes two cooking grills 14, two handles 16, two warming grills 18 and two supporting elements 20.

The casing 10 includes two lateral walls extending from a front wall to a rear wall. Each of the lateral walls includes a cutout 22 defined in an upper edge.

Each of the cooking grills 14 is pivotally connected to the casing 10. Each of the cooking grills 14 includes two lugs 24 formed thereon.

Each of the handles 16 is connected to a corresponding one of the cooking grills 14. The handles 16 are placed out of the casing 10 while the cooking grills 14 are placed in the casing 10. Each of the handles 16 is inserted through a corresponding one of the cutouts 22.

The warming grills 18 are pivotally connected to the cover 12 by an axle 26. Each of the warming grills 18 includes middle bars 28 and two lateral bars 30. The middle bars 28 and the lateral bars 30 substantially extend parallel to one another. Each of the lateral bars 30 includes a J-shaped portion 32 formed at an end and a U-shaped portion 34 formed near another end. The axle 26 is inserted through the J-shaped portions 32 of the lateral bars 30, placed against the middle bars 28, and connected to the cover 12.

Figure 6:
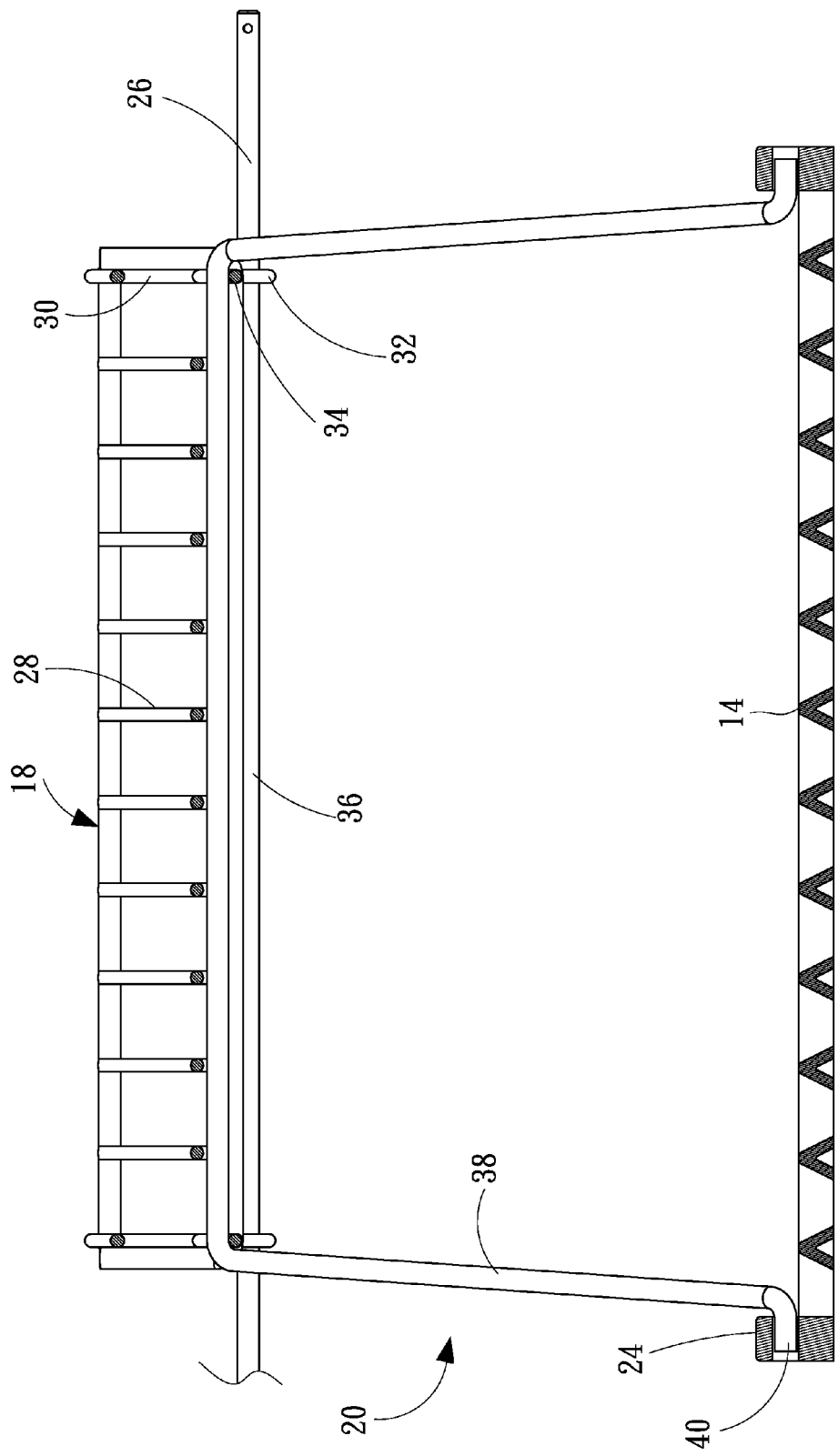
FIG. 6 is a cross-sectional view of a warming grill and a supporting element of the barbecue grill apparatus shown in FIG. 1.

Referring to FIG. 6, each of the supporting elements 20 includes a beam 36, two posts 38 and two pivots 40. The posts 38 extend from the beam 36. Each of the pivots 40 extends from a corresponding one of the posts 38. The beam 36 extends parallel to the pivots 40.

The beam 36 of each supporting element 20 is inserted through the U-shaped portions 34 of the lateral bars 30 of the corresponding warming grill 18 and placed against the middle bars 28 of the corresponding warming grill 18. Thus, the supporting elements 20 are pivotally connected to the warming grills 18.

The pivot 40 of each supporting element 20 is inserted in the lug 24 of the corresponding cooking grill 14. Thus, the supporting elements 20 are pivotally connected to the cooking grills 14.

As mentioned above, the cover 12 can be laid on the casing 10 as shown in FIGS. 1 and 2 and lifted from the casing 10 as shown in FIGS. 3 and 4. A user simply places both of the warming racks 18 in an active position as he or she lifts the cover 12 from the casing 10 because the warming grills 18 are connected to the cover 12.

Figure 5:
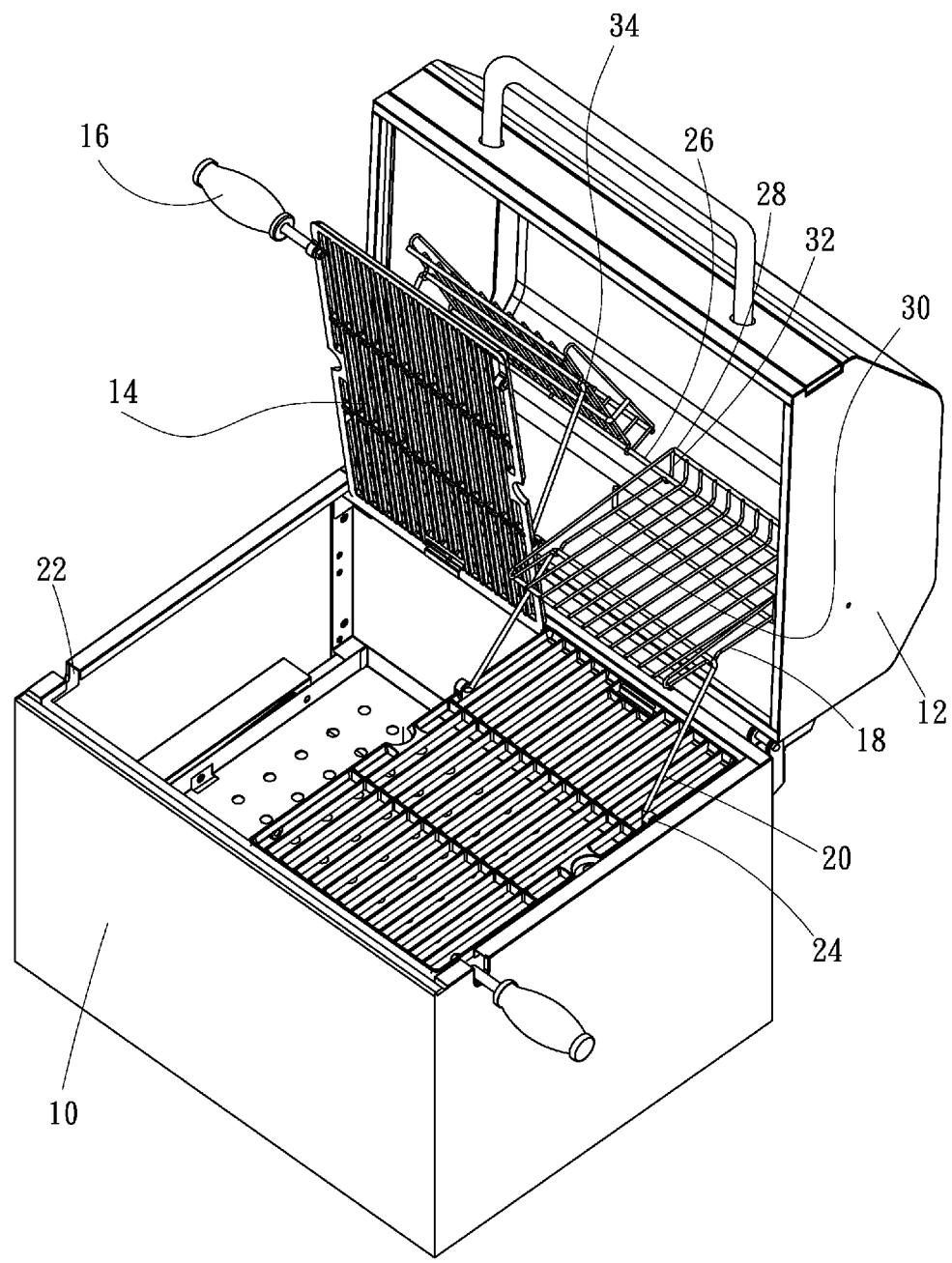
FIG. 5 is a perspective view of the barbecue grill apparatus in another position than shown in FIG. 3.

Referring to FIG. 5, to add coal into the housing 162, the user moves food onto the right cooking grill 14 or warming grill 18 for example before he or she uses a hand to operate the left handle 16 to lift the left cooking grill 14 from the casing 10 and uses the other hand to add coal into the casing 10. When the left cooking grill 14 is lifted from the casing 10, the left warming grill 18 is moved from the active position so that it is not placed above the casing 10. That is, the addition of coal into the casing 10 is not hindered by the left warming grill 18.

The present invention has been described via the detailed illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A barbecue grill apparatus including:
   a casing;
   a cover pivotally connected to the casing;
   two cooking grills pivotally connected to the casing;
   two warming grills pivotally connected to the cover; and
   two supporting elements each for connecting a corresponding one of the cooking grills to a corresponding one of the warming grills, wherein the warming grills are placed horizontally as the cover is lifted from the casing, wherein each of the warming grills is moved from the horizontal position as the corresponding one of the cooking grills is lifted from the casing.

2. The barbecue grill apparatus according to claim 1, further including two handles each connected to a corresponding one of the cooking grills.

3. The barbecue grill apparatus according to claim 1, further including an axle for pivotally connecting the warming grills to the cover.

4. The barbecue grill apparatus according to claim 3, wherein each of the warming grills includes:
   middle bars substantially extending parallel to one another; and
   two lateral bars substantially extending parallel to the middle bars and each including a J-shaped portion formed at an end, wherein the axle is inserted through the J-shaped portions of the lateral bars, placed against the middle bars, and connected to the cover.

5. The barbecue grill apparatus according to claim 1, wherein each of the supporting elements includes:
   a beam pivotally connected to the corresponding one of the warming grills;
   two pivots each pivotally connected to the corresponding one of the cooking grills; and
   two posts each extending to a corresponding one of the pivots from the beam.

6. The barbecue grill apparatus according to claim 5, wherein each of the warming grills includes:
   middle bars substantially extending parallel to one another; and
   two lateral bars substantially extending parallel to the middle bars and each including a U-shaped portion formed at an end, wherein the beam of the corresponding one of the supporting elements is inserted through the U-shaped portions of the lateral bars and placed against the middle bars.

7. The barbecue grill apparatus according to claim 5, wherein each of the cooking grills includes two lugs for receiving the pivots of the corresponding one of the supporting elements.

* * * * *